United States Patent
Kampanakis et al.

(10) Patent No.: US 11,368,487 B2
(45) Date of Patent: Jun. 21, 2022

(54) APPLYING SECURITY POLICIES TO WEB TRAFFIC WHILE MAINTAINING PRIVACY

(71) Applicant: Cisco Technology, Inc., San Jose, CA (US)

(72) Inventors: Panagiotis Theodorou Kampanakis, Cary, NC (US); David Arthur McGrew, Poolesville, MD (US); Richard Lee Barnes, II, Arlington, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 112 days.

(21) Appl. No.: 16/416,794

(22) Filed: May 20, 2019

(65) Prior Publication Data

US 2020/0374314 A1    Nov. 26, 2020

(51) Int. Cl.
*H04L 29/06* (2006.01)
*H04L 9/40* (2022.01)

(52) U.S. Cl.
CPC .......... *H04L 63/20* (2013.01); *H04L 63/0407* (2013.01); *H04L 63/0428* (2013.01); *H04L 63/08* (2013.01); *H04L 63/101* (2013.01); *H04L 63/166* (2013.01)

(58) Field of Classification Search
CPC . H04L 63/20; H04L 63/0407; H04L 63/0428; H04L 63/08; H04L 63/166; H04L 63/101
See application file for complete search history.

(56) References Cited

U.S. PATENT DOCUMENTS

| 6,421,781 B1 * | 7/2002 | Fox .................. H04L 67/04 726/4 |
| 7,934,253 B2 | 4/2011 | Overcash et al. |
| 8,295,306 B2 | 10/2012 | Bagepalli et al. |

(Continued)

OTHER PUBLICATIONS

S. Blake-Wilson et al. "Transport Layer Security (TLS) Extensions"; RFC3546, 2003, 30 pages, Network Working Group. (Year: 2003).*

(Continued)

*Primary Examiner* — Catherine Thiaw
(74) *Attorney, Agent, or Firm* — Edell, Shapiro & Finnan, LLC

(57) ABSTRACT

A computer system applies security policies to web traffic while maintaining privacy. A network security agent is authenticated by a client application to dynamically obtain one or more security policies, wherein the client application and the network security agent are configured to execute on a device and the network security agent is capable of communicating with a source of security policies. Connection information is obtained that includes a request to initiate an encrypted connection with a destination entity. The client application determines whether the encrypted connection between the client application and the destination entity is permitted according to the security policy and based on the connection information. The encrypted connection between the client and the destination entity is established in response to determining that the encrypted connection is permitted. Embodiments may further include a method and computer program product for applying security policies to web traffic.

20 Claims, 6 Drawing Sheets

(56) References Cited

U.S. PATENT DOCUMENTS

| | | | |
|---|---|---|---|
| 8,649,275 B2 | 2/2014 | Pyatkovskiy et al. | |
| 8,732,794 B2* | 5/2014 | Boodaei | H04L 63/0263 726/2 |
| 9,083,727 B1* | 7/2015 | Stamos | H04L 41/0893 |
| 9,419,942 B1* | 8/2016 | Buruganahalli | H04L 63/0236 |
| 10,027,627 B2 | 7/2018 | Parla et al. | |
| 10,091,239 B2 | 10/2018 | Ylonen et al. | |
| 10,212,130 B1* | 2/2019 | Yang | H04L 63/0236 |
| 2004/0236962 A1* | 11/2004 | Wong | H04L 63/168 726/3 |
| 2007/0288750 A1* | 12/2007 | Camenisch | H04L 63/20 713/168 |
| 2008/0263215 A1* | 10/2008 | Schnellbaecher | H04L 63/166 709/229 |
| 2012/0221685 A1* | 8/2012 | Wu | H04W 76/10 709/218 |
| 2014/0109174 A1* | 4/2014 | Barton | H04L 63/0272 726/1 |
| 2014/0140331 A1* | 5/2014 | Lee | H04L 63/10 370/338 |
| 2014/0324892 A1* | 10/2014 | Tong | G06F 16/9535 707/754 |
| 2015/0188943 A1 | 7/2015 | Williams et al. | |
| 2015/0372977 A1* | 12/2015 | Yin | H04L 63/0272 726/1 |
| 2016/0323318 A1* | 11/2016 | Terrill | H04L 63/0227 |
| 2017/0078328 A1* | 3/2017 | McGinnity | H04L 63/0281 |
| 2017/0103201 A1* | 4/2017 | Fox | G06F 21/566 |
| 2017/0127280 A1* | 5/2017 | Backholm | H04L 63/166 |
| 2017/0339563 A1* | 11/2017 | Singleton, IV | H04L 63/083 |
| 2017/0374016 A1 | 12/2017 | Reddy et al. | |
| 2017/0374089 A1 | 12/2017 | Anderson et al. | |
| 2018/0097835 A1 | 4/2018 | McGrew et al. | |
| 2018/0103056 A1 | 4/2018 | Kohout et al. | |
| 2018/0302410 A1* | 10/2018 | Venkataraman | H04L 63/0245 |
| 2018/0343174 A1* | 11/2018 | Battre | H04L 67/02 |

OTHER PUBLICATIONS

Thomas Demuth and Andreas Rieke, "Securing the Anonymity of Content Providers in the World Wide Web", 1999, Part of the IS&T/SPIE Conference on Security and Watermarking of Multimedia Contents, p. 494-502 (Year: 1999).*

Chris Grier, Shuo Tang, and Samuel T. King "Secure web browsing with the OP web browser", 2008, IEEE, p. 402-416 (Year: 2008).*

Check Point Software Technologies Ltd., "Check Point SandBlast Agent for Browsers", https://supportcenter.checkpoint.com/supportcenter/portal?eventSubmit_doGoviewsolutiondetails=&solutionid=sk108695&partition=General&product=Threat, Nov. 15, 2015, 5 pages.

E. Rescorla, "The Transport Layer Security (TLS) Protocol Version 1.3", Internet Engineering Task Force (IETF), Request for Comments: 8446, Aug. 2018, 160 pages.

P. Hoffman et al., "DNS Queries over HTTPS (DoH)", Internet Engineering Task Force (IETF), Request for Comments: 8484, Category: Standards Track, ISSN: 2070-1721, 21 pages.

Trend Micro Incorporated, "Supported browsers for URL filtering for HTTPS traffic", https://success.trendmicro.com/solution/1060142-supported-browsers-for, Jan. 22, 2018, 3 pages.

Andrew M. White, "Practical Analysis of Encrypted Network Traffic", https://cdr.lib.unc.edu/indexablecontent/uuid:a009d909-d0f3-4870-a49c-294cd966ab5a, Dec. 2015, 159 pages.

* cited by examiner

APPLYING SECURITY POLICIES TO WEB TRAFFIC WHILE MAINTAINING PRIVACY

TECHNICAL FIELD

The present disclosure relates to applying security policies to web traffic while maintaining end-user privacy.

BACKGROUND

Security policies protect traffic in a network by preventing unauthorized access, modification, or disclosure of information. For example, a security policy may enforce traffic rules, identify threats and vulnerabilities, and provide access controls. As encrypted standards for traffic become increasingly popular, it has become more difficult to apply security policies that do not compromise at least some of the benefits offered by encryption. In particular, security policies may require decryption of traffic in order to be applied, which may constitute an invasion of privacy of an end-user. Furthermore, performing decryption of traffic can negatively impact network performance.

DESCRIPTION OF EXAMPLE EMBODIMENTS

Overview

In one embodiment, a computer-implemented method is provided comprising: authenticating, by a client application, a network security agent to dynamically obtain one or more security policies from the network security agent, wherein the client application and the network security agent are configured to execute on a user device and the network security agent is capable of communicating with a source of security policies; obtaining, by the client application, connection information that includes a request to initiate an encrypted connection with a destination entity; determining, by the client application, whether the encrypted connection between the client application and the destination entity is permitted according to the security policy and based on the connection information; and establishing the encrypted connection between the client application and the destination entity in response to determining that the encrypted connection is permitted.

EXAMPLE EMBODIMENTS

The present disclosure relates to web security policies, and more specifically, to applying security policies to web traffic while maintaining end-user privacy. The volume of web traffic that is encrypted has increased due to efforts to address privacy concerns of end-users. Additionally, information that was unencrypted before, such as information presented in an X.509 digital certificate, Server Name Indication (SNI), or Domain Name Service (DNS) request or response, is increasingly being encrypted in order to ensure user privacy and prevent censorship. However, many policies cannot be applied to encrypted traffic unless active man-in-the-middle decryption is employed, thereby circumventing the privacy benefits offered by end-to-end encryption of traffic. Present embodiments enable the application of security policies to encrypted traffic by providing an interface that clients may utilize to apply policies to encrypted client web traffic. In particular, an agent is provided on a client device that enables the client device to initiate application of a security policy. Since the agent does not initiate connections or force policy uploads to the client device, a security policy can be safely applied to traffic in a client-side manner that does not expose any data outside of the client or involve the circumvention of end-to-end encryption. Furthermore, by avoiding unnecessary decryption and re-encryption operations, present embodiments enable the application of security policies to encrypted traffic in a manner that lessens the impact to network performance.

Figure 1:
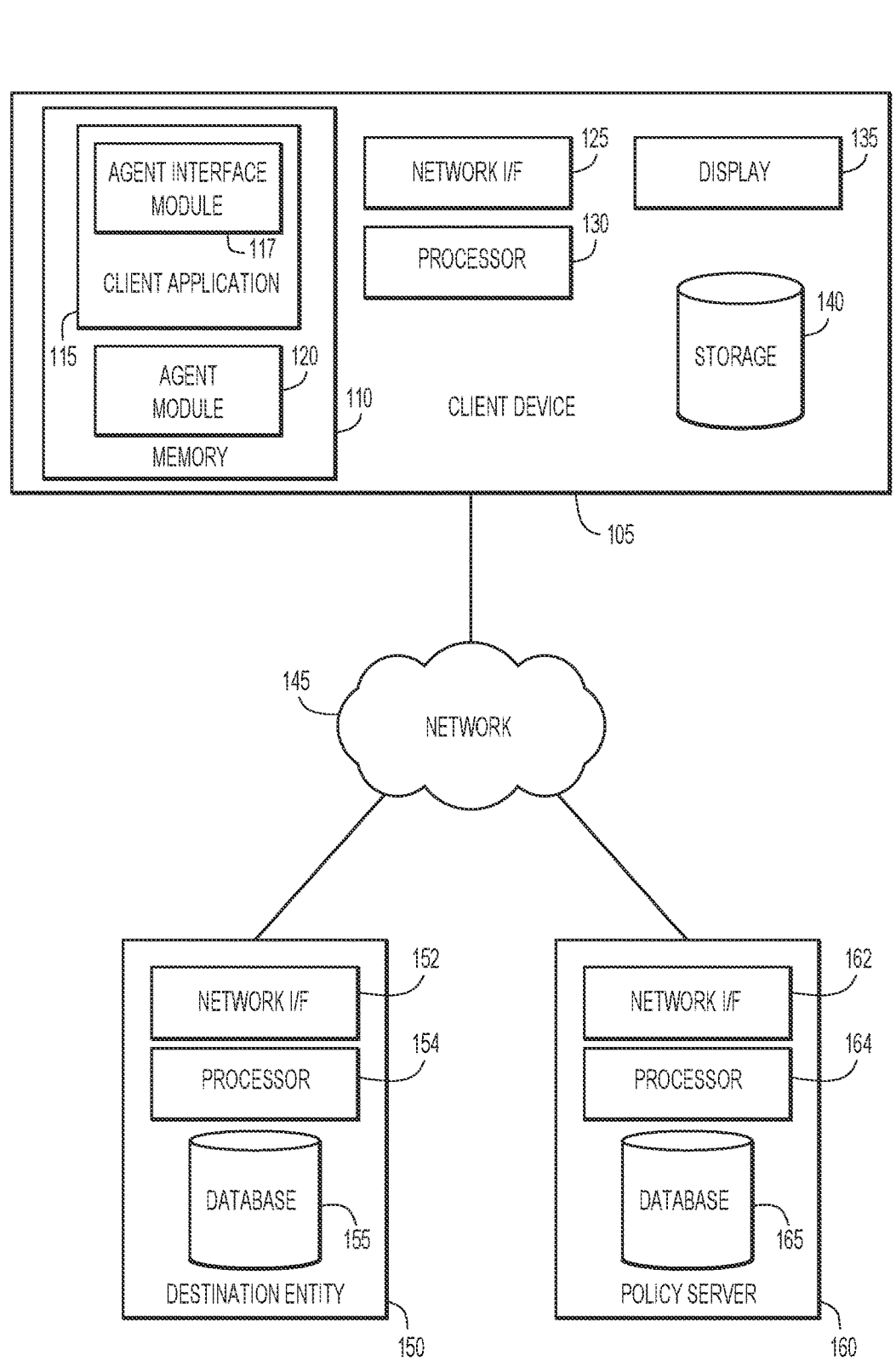
FIG. 1 is block diagram depicting a network environment for applying web security policies, in accordance with an example embodiment.

Embodiments are now described in detail with reference to the figures. FIG. 1 is a block diagram depicting a network environment 100 for applying web security policies in accordance with an example embodiment. As depicted, network environment 100 includes a client device 105, a destination entity 150, and a policy server 160. It is to be understood that the functional division among components of network environment 100 have been chosen for purposes of explaining the embodiments and is not to be construed as a limiting example.

Client device 105 includes a network interface (I/F) 125, a processor 130, a display 135, storage device 140, and memory 110. The memory 110 stores software instructions for client application 115, agent interface module 117, and agent module 120, as well as various other data involved in operations performed by the processor 130. In various embodiments, client device 105 may include a server, laptop computer, a tablet computer, a netbook computer, a personal computer (PC), a desktop computer, a personal digital assistant (PDA), a smart phone, a thin client, or any programmable electronic device capable of executing computer readable program instructions. Client device 105 may include internal and external hardware components, as depicted and described in further detail with respect to FIG. 6. Moreover, client device 105 may be virtualized and embodied by a process running in a data center or cloud computing environment.

Client application 115, agent interface module 117, and agent module 120 may include one or more modules or units to perform various functions of the embodiments described below. Client application 115, agent interface module 117, and agent module 120 may be implemented by any combination of any quantity of software (and/or hardware modules or units), and may reside within memory 110 of client device 105 for execution by a processor, such as processor 130.

Client application 115 may include any application for retrieving, presenting, and traversing documents and other media or data that are accessible over a network, such as an intranet or the World Wide Web (WWW)/Internet. A user of client device 105 may use client application 115 to access data on a remote server, such as destination entity 150. In some embodiments, client application 115 includes any known or other web browser software. Client application 115 may support any protocols or combinations thereof. Client application 115 may support cryptographic protocols such as Transport Layer Security (TLS). In particular, client application 115 may support the SNI extension of TLS, which enables a server to present multiple certificates on the same Internet Protocol (IP) address and Transmission Control Protocol (TCP) port number, thereby allowing multiple secure Hypertext Transfer Protocol Secure (HTTPS) web sites (or any other service over TLS) to be served by the same IP address without requiring all of the websites to use the same certificate. Client application 115 may apply end-to-end encryption: data may be encrypted before leaving client application 115, and client application 115 may decrypt any received encrypted data. Client application 115 may initiate each communication with agent interface module 117 and/or agent module 120 in order to ensure that end user privacy is maintained within client application 115.

Agent module 120 may include any application for obtaining and applying security policies to encrypted traffic while maintaining data privacy within client application 115. Agent module 120 may receive security policy information from a policy server, such as policy server 160. Security policy information may be received periodically or on an ad hoc basis (e.g., when updated security policy information is made available by a policy server 160). Security policy information may include a list of entity names (e.g., server names) and corresponding assessments, as well as actions to be performed based on an entity's assessment category. For example, security policy information may contain an entry indicating that companyx.example.com belongs to an assessment category of "malicious," and that any connections to websites belonging to the "malicious" category should be blocked. An assessment list may use wildcard operators to indicate that all subdomains of a particular domain should be blocked; for example, assigning a malicious assessment to *.companyx.example.com may indicate that any subdomains of companyx.example.com are to be treated as belonging to the "malicious" category. In some embodiments, agent module 120 selects a security policy based on a network location of client device 105. For example, a stricter security policy may be used when client device 105 is connected to the Internet via an unsecured network.

Agent interface module 117 enables agent module 120 to interface with client application 115 in order to apply security policies without exposing unencrypted information beyond client application 115. In some embodiments, agent interface module 117 is a plug-in or extension of client application 115. Agent interface module 117 may enable agent module 120 to pass instructions for the application of a security policy to client application 115. Thus, client application 115 may determine whether an encrypted connection should be allowed between client application 115 and a destination entity without exposing any unencrypted data, including server names, outside of client application 115. In some embodiments, agent module 120 stores static policy rules that can be applied to traffic of client application 115. In other embodiments, client application 115 may, via agent interface module 117, dynamically query agent module 120 in order to receive information, such as the assessment of a particular server name. Agent interface module 117 may obtain a server name from client application 115 via one or more of: a TLS SNI field, a server or client certificate, a DNS request or response, and the like. In some embodiments, agent interface module 117 obtains a server name from user input provided to client application 115, such as when a user manually provides a uniform resource locator (URL). When an assessment is determined for a server name, agent interface module 117 may provide client application 115 with the appropriate action, such as "allow connection" or "block connection," and client application 115 may then perform the action.

In some embodiments, when a connection is permitted, client application 115 may insert a tag in one or more data flows outbound from client application 115 to indicate that the connection has been subjected to a security policy and has been approved. A tag may be inserted into an unencrypted portion of a flow; for example, the tag may be inserted into an outbound portion of a handshake, such as in a random value in in unencrypted portion of the TLS handshake. The tag may be used by a network vendor or agent or administrator in order to identify encrypted connections that have been approved by a security policy in accordance with embodiments presented herein. Known or other cryptographic techniques may be utilized to add a tag that can only be interpreted by an authorized agent or network middlebox (appearing random to all other parties), which may require client application 115 and agent 120 to have a pre-established cryptographic relationship that is established during the configuration process for agent interface module 117.

Display 135 may include any electronic device capable of presenting information in a visual form. For example, display 135 may be a liquid crystal display (LCD), a cathode ray tube (CRT) display, a light-emitting diode (LED) display, an electronic ink display, and the like. Display 135 may be used for the presentation of content to a user, including any content accessed by client application 115.

Storage device 140 may include any non-volatile storage media known in the art. For example, storage device 140 can be implemented with a tape library, optical library, one or more independent hard disk drives, or multiple hard disk drives in a redundant array of independent disks (RAID). Similarly, data in storage device 140 may conform to any suitable storage architecture known in the art, such as a file, a relational database, an object-oriented database, and/or one or more tables. Storage device 140 may store data corresponding to security policies, including assessment lists and actions to be performed based on assessment categories.

Network 145 may include a local area network (LAN), a wide area network (WAN) such as the Internet, or a combination thereof, and includes wired, wireless, or fiber optic connections. In general, network 145 can use any combination of connections and protocols that support communications between client device 105, destination entity 150, and/or policy server 160 via their network interfaces 125.

Destination entity 150 includes a network interface 152, at least one processor 154, and a database 155. In some example embodiments, destination entity 150 is a server, such as a web server, that is accessible by clients, such as client application 115. Destination entity 150 may support known or other secure transmission protocols, including any form of end-to-end encryption with clients. In various embodiments, destination entity 150 may include a laptop computer, a tablet computer, a netbook computer, a personal computer (PC), a desktop computer, a personal digital assistant (PDA), a smart phone, or any programmable electronic device capable of executing computer readable program instructions. Network interface 152 may include one or more network interface cards that enable components of destination entity 150 to send and receive data over a network, such as network 145. Destination entity 150 may include internal and external hardware components, as depicted and described in further detail with respect to FIG. 6.

Database 155 may include any non-volatile storage media known in the art. For example, database 155 can be implemented with a tape library, optical library, one or more independent hard disk drives, or multiple hard disk drives in a redundant array of independent disks (RAID). Similarly, data on database 155 may conform to any suitable storage architecture known in the art, such as a file, a relational database, an object-oriented database, and/or one or more tables. In some embodiments, database 155 stores data relating to one or more websites, including one or more webpages that can be retrieved and viewed by a web browser, and other media.

Policy server 160 includes a network interface 162, at least one processor 164, and a database 165. Network interface 162 may include one or more network interface cards that enable components of policy server 160 to send and receive data over a network, such as network 145. In some example embodiments, policy server 160 serves as a repository for security policies. Policy server 160 may provide security policy information to a client, such as client device 105. Policy server 160 may provide updated security policy information on a scheduled basis or when update information becomes available. In some embodiments, agent module 120 of client device 105 initiates a request for security policy information from policy server 160. Policy server 160 may be implemented as a virtual service running in the cloud. Policy server 160 may include internal and external hardware components, as depicted and described in further detail with respect to FIG. 6.

Database 165 may include any non-volatile storage media known in the art. For example, database 165 can be implemented with a tape library, optical library, one or more independent hard disk drives, or multiple hard disk drives in a redundant array of independent disks (RAID). Similarly, data on database 165 may conform to any suitable storage architecture known in the art, such as a file, a relational database, an object-oriented database, and/or one or more tables. Database 165 may store data relating to security policies, including one or more lists of entity names (e.g., server names) and corresponding assessments, as well as actions to be performed based on an entity's assessment category.

Figure 2:
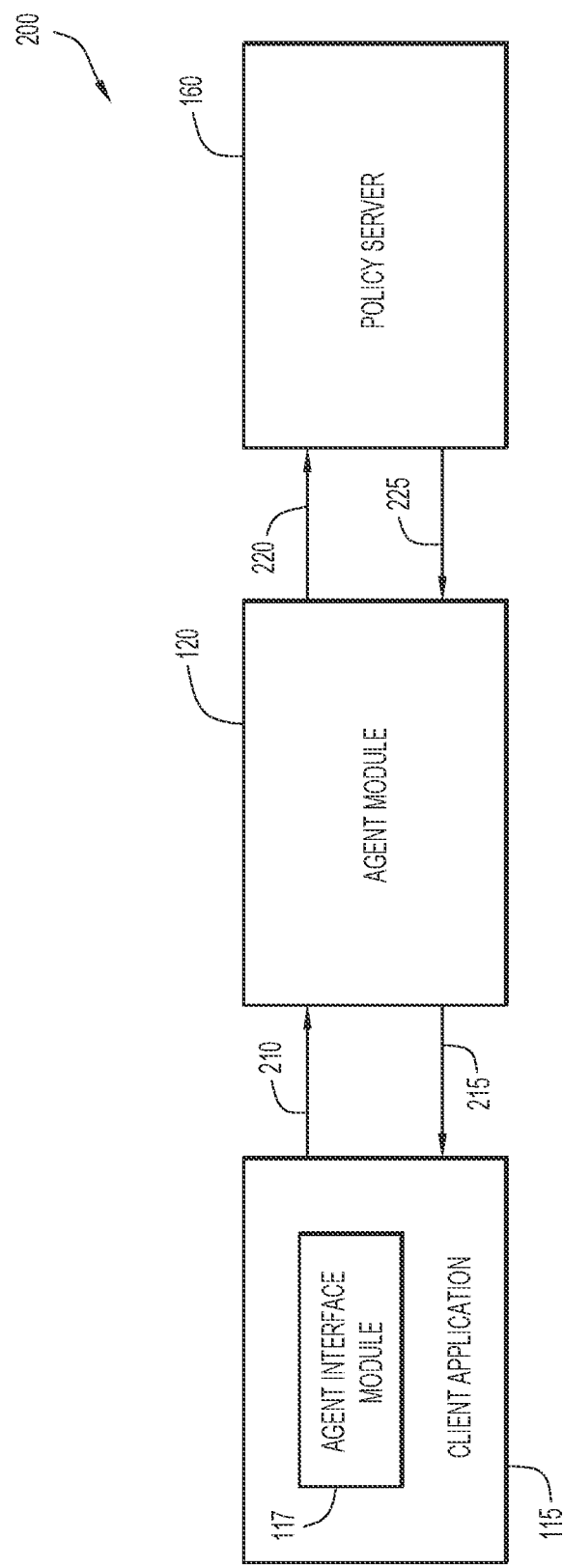
FIG. 2 is a diagram depicting an operational flow for applying web security policies, in accordance with an example embodiment.

Reference is now made to FIG. 2. FIG. 2 is a block diagram depicting a high-level operational flow 200 for applying web security policies, in accordance with an example embodiment. Reference is also made to FIG. 1 for purposes of the description of FIG. 2. As depicted, the operational flow 200 involves interactions of the client application 115, the agent interface module 117, the agent module 120, and the policy server 160, which are described in detail with reference to FIG. 1.

In one example, a security policy may be either a static security policy or a dynamic security policy. In a static security policy, a list of entity names and corresponding assessments may be stored client-side by agent interface module 117 of client application 115. When client application 115 initiates a connection with a remote host, client application 115 may send a request to agent interface module 117 containing information about the destination entity, and the client application 115 may apply the static security policy that includes a suggested action after the response from the agent interface module 117. Alternatively, a dynamic security policy may be a lightweight security policy in which an assessment list is not stored within client application 115 or agent interface module 117, but is rather maintained by agent module 120. To apply a dynamic security policy, client application 115 sends a request for an assessment of an entity to agent module 120 via agent interface module 117. Agent module 120 determines an assessment for the queried entity and sends the assessment back to agent interface module 117.

Reference numerals 210 and 215 indicate an exchange of data between client application 115 and agent interface module 117 on one hand, and agent module 120 on the other. In embodiments having a static security policy, at 210, agent interface module 117 may send a request to agent module 120 to receive security policy information. Similarly, agent module 120 may respond with security policy information at 215. In embodiments having a dynamic security policy, agent interface module 117 may send a request to receive an assessment of a particular entity, and may receive a response indicating the entity's assessment. Further, in embodiments having a dynamic security policy, agent interface module 117 may send one or more deliberately fictitious requests containing erroneous connection information to preserve user privacy, such as an entity name that is not being requested by client application 115. In particular, when fictitious requests are included alongside a legitimate request, an observer may not discern which request may contain actual sensitive information.

Reference numerals 220 and 225 indicate an exchange of data between agent module 120 and policy server 160. In some embodiments, agent module 120 may initiate contact with policy server 160 to request security policy information at 220. At 225, policy server 160 may initiate a transfer of updated security policy information to agent module 120 on a predetermined basis or on an ad hoc basis when updated information becomes available.

Figure 3:
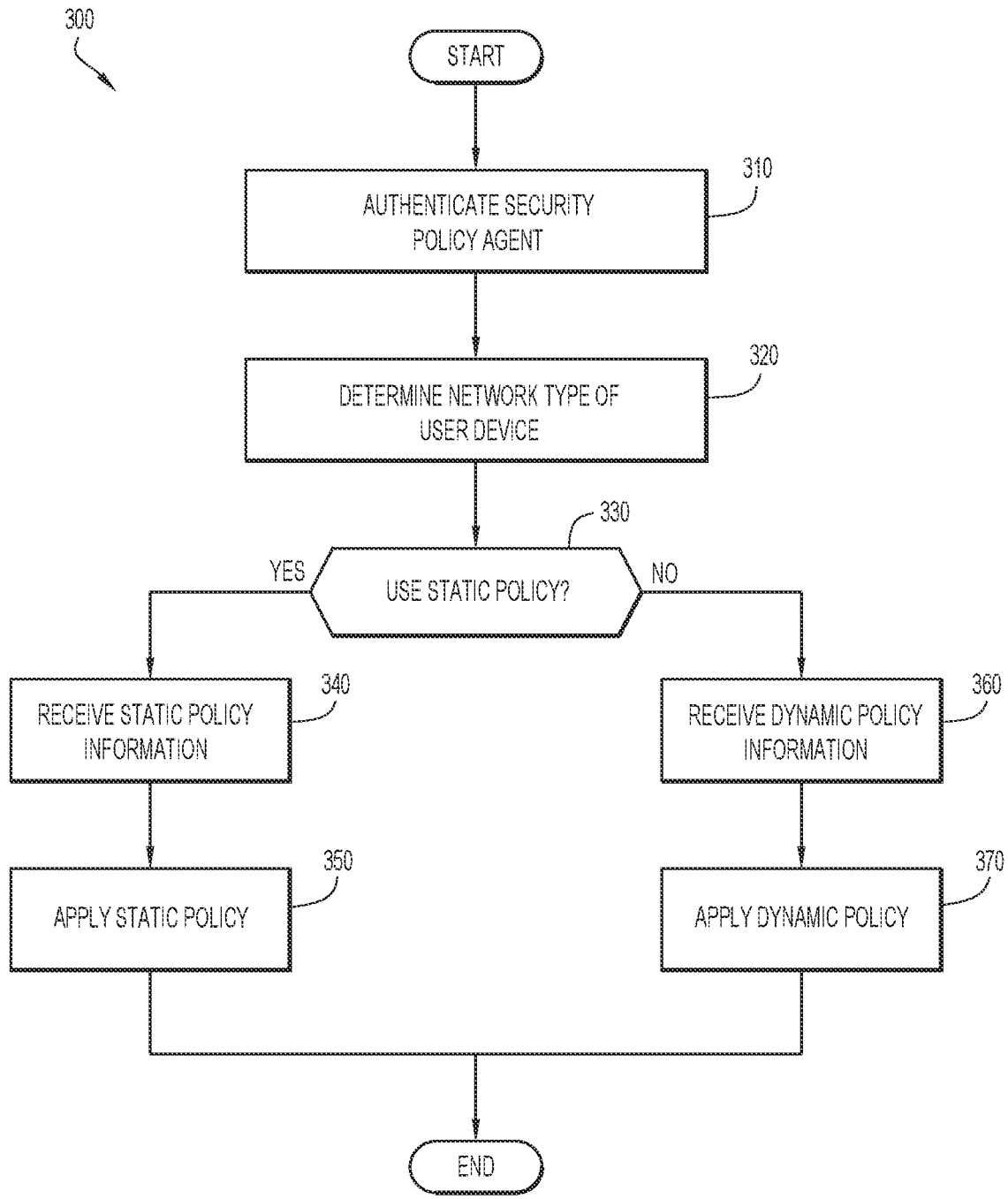
FIG. 3 is a flow chart depicting a method of establishing and applying a web security policy, in accordance with an example embodiment.

Reference is now made to FIG. 3. FIG. 3 is a flow chart depicting a method 300 of establishing and applying a web security policy, in accordance with an example embodiment. Reference is also made to FIG. 1 for purposes of the description of FIG. 3. In one form, the processor 130 of the client device 105 performs the operations of method 300 by executing instructions for the client application 115, the agent interface module 117, and the agent module 120.

A security policy agent is authenticated at operation 310. Client application 115 may authenticate agent interface module 117 and/or agent module 120 via known or other authentication mechanisms. In some embodiments, client application 115 authenticates agent interface module 117 and agent module 120 using certificate-based authentication. In some embodiments, agent 120 and client application 115 also perform key sharing to establish keying materials that can be used to insert tags in a TLS handshake that appear random to outside observers.

The network type of a user device is determined at operation 320. A user device, such as client device 105, may provide its network connectivity information to agent module 120 to facilitate selection of a security policy. Agent module 120 may select a policy based on the type of a current network connection. For example, a policy may be selected based on whether client device 105 is connected to a particular Virtual Private Network (VPN), whether client device 105 is connected to the Internet via an access point that requires an encrypted protocol, such as a wireless router using a Wi-Fi® Protected Access II (WPA2) protocol, and the like. Client device 105 may likewise indicate that it is connected to an open access point. Depending on the security of the network connection, a stricter security policy may be applied. For example, if client device 105 is connected to an open access point, a stricter policy may be applied.

Operation 330 determines whether to apply a static security policy or a dynamic security policy. In some embodiments, a user is prompted to select either a static security policy or a dynamic security policy. The decision to apply a static or a dynamic security policy may depend on performance factors of a client device, or the type and version of web browser (e.g., client application 115) installed on the client device. For example, if a client device has limited memory resources, the dynamic security policy may be applied. In some embodiments, the decision to select a static or a dynamic security policy is based a network's security policy. For example, the selection of a security policy may be provided to client application 115 via a service associated with a network's security policy, under control of an enterprise network administrator or IT department.

If a static security policy is selected, then information relating to the static security policy is received at operation 340. The security policy may include a list of entity names (e.g., server names) and corresponding assessments, as well as actions to be performed based on an entity's assessment category. Security policy information may be received by agent module 120 from policy server 160. The static policy is applied at operation 350 when the security policy information is obtained by agent interface module 117; application of a static security policy will be described in further detail with reference to FIG. 4.

If a dynamic security policy is selected, then information relating to the dynamic security policy is received at operation 360. The security policy may include a list of entity names (e.g., server names) and corresponding assessments, as well as actions to be performed based on an entity's assessment. Security policy information may be received by agent module 120 from policy server 160. The dynamic policy is applied at operation 370 when a list of entities and corresponding assessments is obtained by agent module 120, and may be forwarded to client application 115 by agent interface module 117. Application of a dynamic security policy will be described in further detail with reference to FIG. 5.

Figure 4:
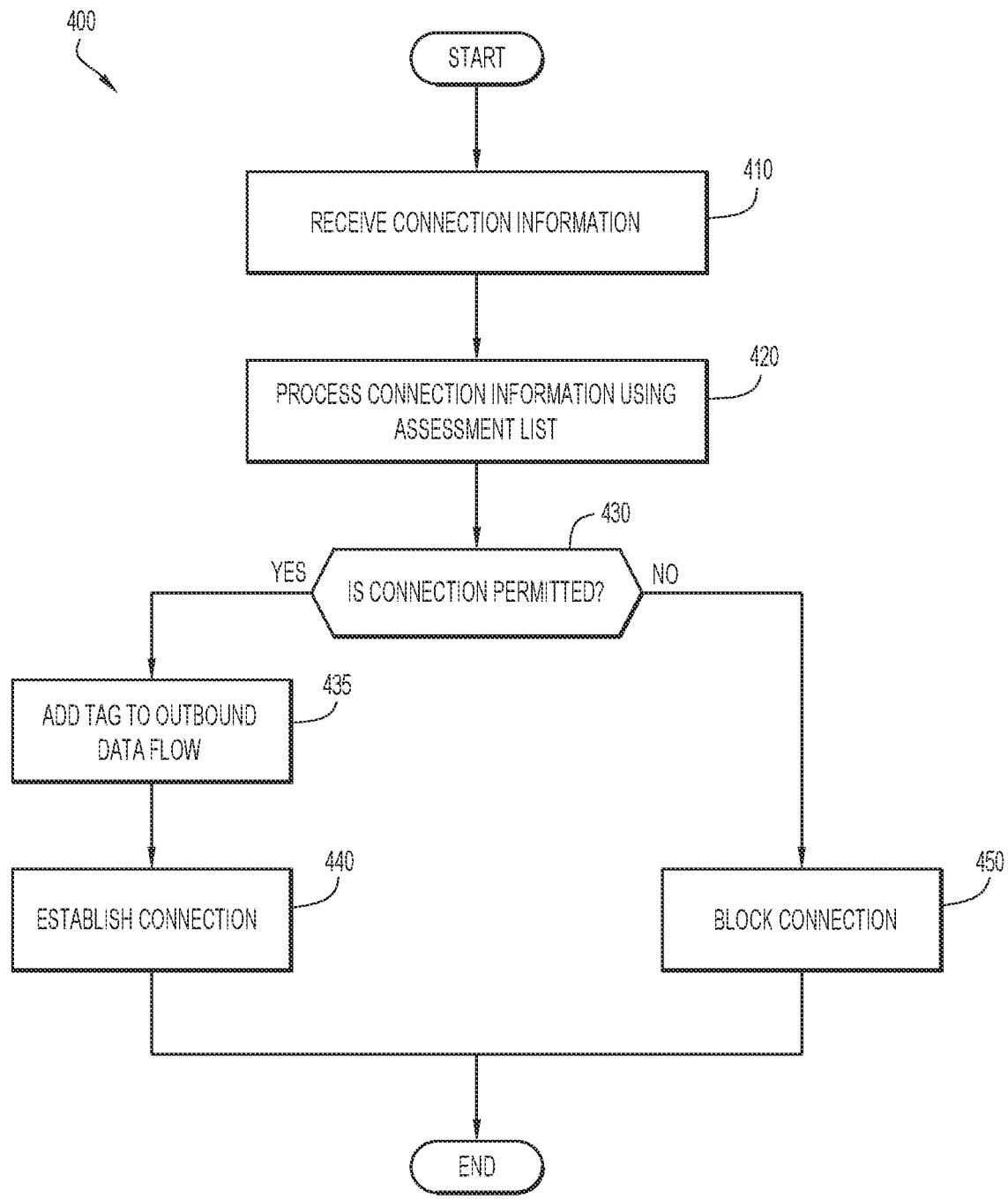
FIG. 4 is a flow chart depicting a method of applying a static security policy, in accordance with an example embodiment.

Reference is now made to FIG. 4. FIG. 4 is a flow chart depicting a method of applying a static security policy, in accordance with an example embodiment. Reference is also made to FIG. 1 for purposes of the description of FIG. 4. In one form, the processor 130 of the client device 105 performs the operations of method 400 by executing instructions for the client application 115, the agent interface module 117, and the agent module 120.

Connection information is received at operation 410. Connection information may be received by agent interface module 117 when client application 115 requests to initiate a connection with a destination entity. Connection information may include any information that identifies a destination entity. Client application 115 may initiate the process of applying a security policy by providing agent interface module 117 with the identification of a destination entity. The destination entity may be obtained from client application 115 from a DNS request or response, fields in a server X.509 certificate or SNI certificate, or may be collected when a user manually inputs a URL into an address bar of client application 115. Such information may be encrypted by default in current and future standards, rendering the information inaccessible by a network agent unless the client reveals the information in a query.

The connection information is processed using an assessment list at operation 420, and operation 430 determines whether the connection is permitted. The decision to permit or deny a connection is determined based on the category of an entity's assessment. Agent interface module 117 may consult the security policy, such as static security policy information obtained at operation 340 in FIG. 3, to determine the assigned action for the assessment of the entity. For example, agent interface module 117 may determine that a connection to a destination entity should be established when the entity's assessment category is "safe;" similarly, agent interface module 117 may determine that a connection to an entity belonging to the "explicit content" or other similar category should be denied.

If a connection is determined to be permitted at operation 430, then a tag may be added to an outbound data flow at operation 435 to indicate that a security policy has been applied and that the connection has been approved. In some embodiments, the tag may be a string of data that is inserted into an unencrypted portion of an outbound data flow, such as a nonce in the TLS handshake. The tag may be used by agent interface module 117, an administrator, or a network vendor in verifying the subject connection. In particular, the inserted tag can be constructed in a manner such that the tag can only be interpreted by an authorized agent (e.g., agent interface module 117) or a network middlebox. At operation 440, agent interface module 117 may instruct client application 115 to establish the connection. Client application 115 may then perform the identified action and establish the connection by performing actions such as completing a handshake and initiating an exchange of data.

If a connection is determined to be denied at operation 430, then client application 115 may block the connection to the destination entity at operation 450.

Figure 5:
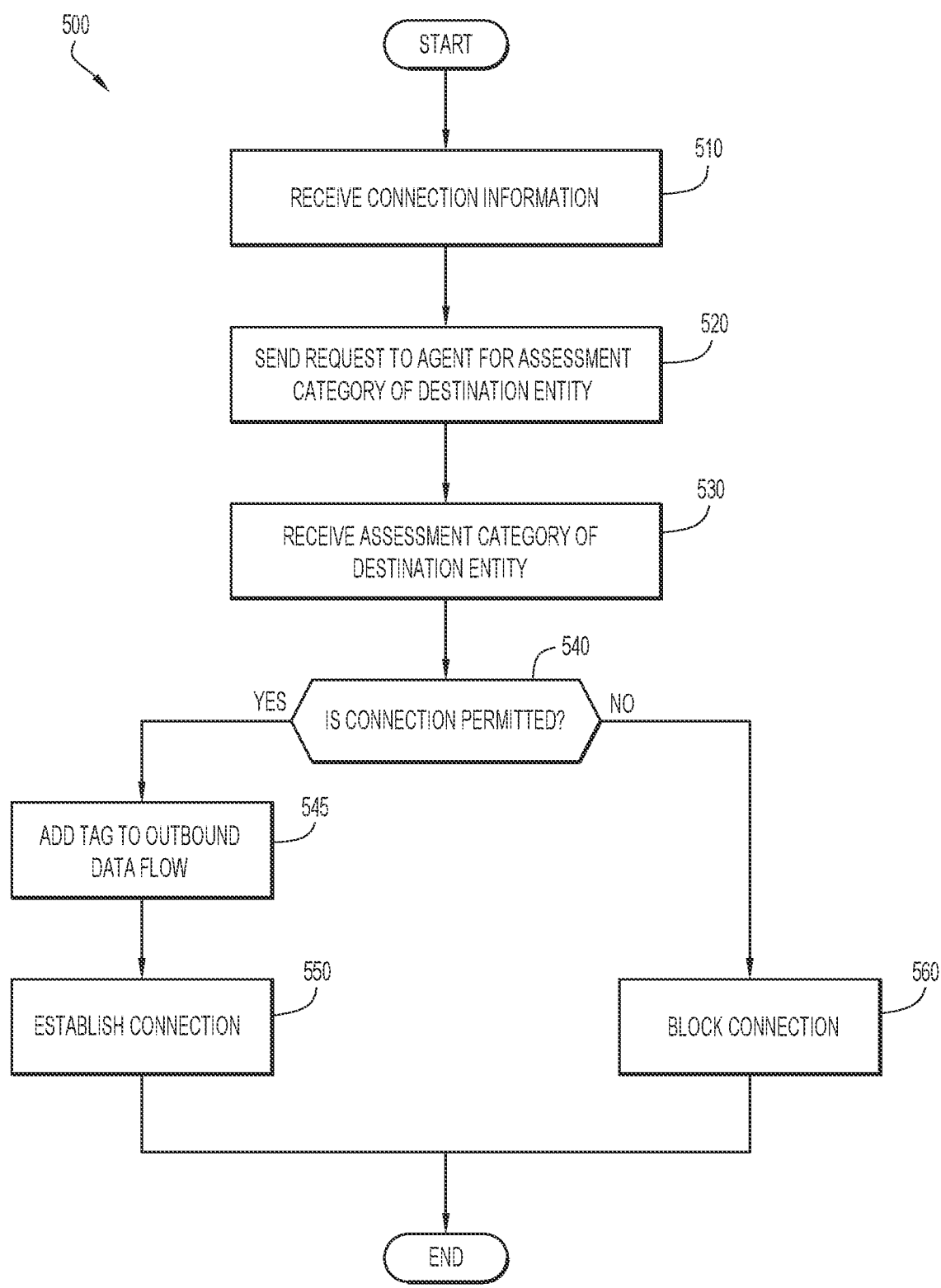
FIG. 5 is a flow chart depicting a method of applying a dynamic security policy, in accordance with an example embodiment.

FIG. 5 is a flow chart depicting a method 500 of applying a dynamic security policy, in accordance with an example embodiment. In one form, the processor 130 of the client device 105 performs the operations of method 500 by executing instructions for the client application 115, the agent interface module 117, and the agent module 120.

Connection information is received at operation 510. Connection information may be received by agent interface module 117 when client application 115 requests to initiate a connection with a destination entity. Connection information may include any information that identifies a destination entity. Client application 115 may initiate the process of applying a security policy by providing agent interface module 117 with the identification of a destination entity. A URL for the destination entity may be obtained from client application 115 from a DNS request or response, fields on an X.509 server certificate, an SNI certificate, or may be collected when a user manually inputs a URL into an address bar of client application 115. Such information may be encrypted by default according to current or future standards, and may thus be inaccessible by a network agent unless the client reveals them in the query A request for a destination entity's assessment is sent to the agent module 120 at operation 520. Agent interface module 117 may send a request containing the identity of the destination entity, which agent module 120 processes to determine an assessment for the entity. Since the identity of the destination entity may be exposed outside of client application 115, agent interface module 117 may send one or more deliberately fictitious requests that contain fictitious connection information to agent module 120. The order of the fictitious requests and legitimate request may be randomized by agent interface module 117 in order to ensure that the legitimate request cannot be identified so that user privacy is protected.

The assessment of the destination entity is received at operation 530. The client application 115 may discard any responses to fictitious requests while retaining the assessment category of the destination entity that was identified in the legitimate request.

Operation 540 determines whether the connection is permitted. The decision to permit or deny a connection is determined based on the assessment of an entity's assessment. Client application 115 may consult the pre-downloaded lightweight security policy information to determine the assigned action for the assessment of the destination entity. For example, agent interface module 117 may determine that a connection to a destination entity should be established when the entity's assessment category is "safe;" similarly, agent interface module 117 may determine that a connection to an entity belonging to the "malicious" category should be denied.

If a connection is determined to be permitted at operation 540, then a tag may be added to an outbound data flow at operation 545 to indicate that a security policy has been applied and that the connection has been approved. In some embodiments, the tag may be a string of data that is inserted into an unencrypted portion of an outbound data flow, such as a nonce in an unencrypted portion of the TLS handshake. The tag may be used by agent interface module 117, an administrator, or a network vendor in verifying the subject connection. At operation 550, client application 115 may then perform the identified action and establish the connection by performing actions such as completing a handshake and initiating an exchange of data. Client application 115 may initiate the establishing of a connection by querying agent interface module 117 and performing the identified action.

If a connection is determined to be denied at operation 540, then client application 115 may block the connection to the destination entity at operation 560. Client application 115 may then perform the identified action and block the connection.

Figure 6:
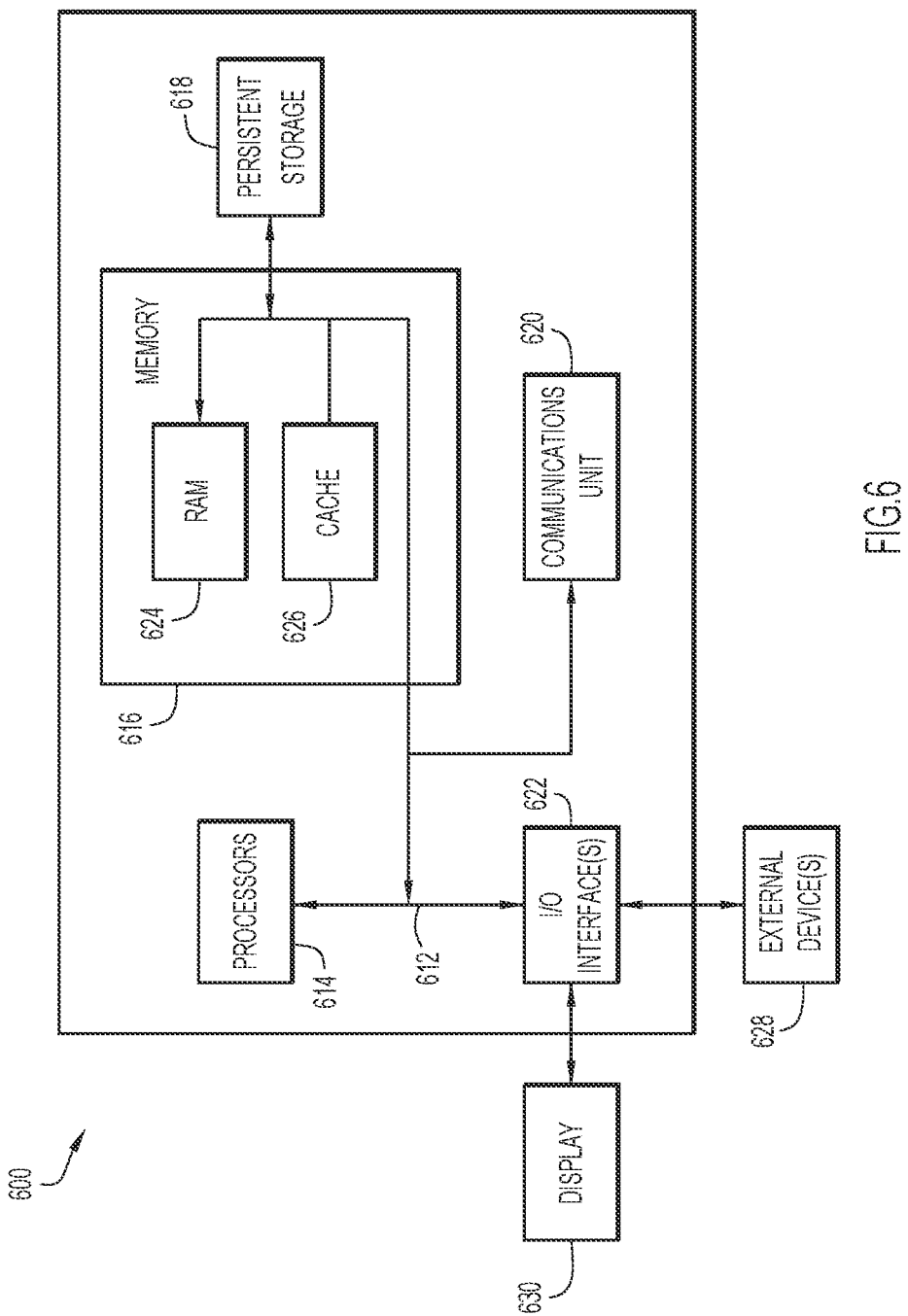
FIG. 6 is a block diagram depicting a computing device configured to perform the methods presented herein, in accordance with an example embodiment.

FIG. 6 is a block diagram depicting components of a computer 600 suitable for executing the methods disclosed herein. Computer 600 may implement client device 105, destination entity 150, and policy server 160 in accordance with embodiments presented herein. It should be appreciated that FIG. 6 provides only an illustration of one embodiment and does not imply any limitations with regard to the environments in which different embodiments may be implemented. Many modifications to the depicted environment may be made.

As depicted, the computer 600 includes communications fabric 612, which provides communications between computer processor(s) 614, memory 616, persistent storage 618, communications unit 620, and input/output (I/O) interface(s) 622. Communications fabric 612 can be implemented with any architecture designed for passing data and/or control information between processors (such as microprocessors, communications and network processors, etc.), system memory, peripheral devices, and any other hardware components within a system. For example, communications fabric 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. The memory 616 may store the software instructions for the client application 115, agent interface module 117 and agent module 120 used by the client device 105 in performing the operations described herein.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer 600. For example, I/O interface 622 may provide a connection to external devices 628 such as a keyboard, keypad, a touch screen, and/or some other suitable input device. External devices 628 can also include portable computer readable storage media such as, for example, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to applying web security policies (e.g., security policy information, entity information, entity assessment information, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105, destination entity 150, and/or policy server 160 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to applying web security policies (e.g., security policy information, entity information, entity assessment information, etc.) may include any information provided to, or generated by, client device 105, destination entity 150, and/or policy server 160. Data relating to applying web security policies may include any desired format and arrangement, and may include any quantity of any types of fields of any size to store any desired data. The data relating to applying web security policies may include any data collected about entities by any collection means, any combination of collected information, and any information derived from analyzing collected information.

The present embodiments may employ any number of any type of user interface (e.g., representational state transfer (REST) application programming interfaces (API), Graphical User Interface (GUI), command-line, prompt, etc.) for obtaining or providing information (e.g., data relating to leakage detection), where the interface may include any information arranged in any fashion. The interface may include any number of any types of input or actuation mechanisms (e.g., REST APIs, buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of applying security policies to web traffic while maintaining privacy.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., client application 115, agent interface module 117, agent module 120, etc.). These systems may include any types of monitors and input devices (e.g., keyboard, mouse, voice recognition, etc.) to enter and/or view information.

It is to be understood that the software (e.g., client application 115, agent interface module 117, agent module 120, etc.) of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments (e.g., client application 115, agent interface module 117, agent module 120, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to leakage detection). The database system may be implemented by any number of any conventional or other databases, data stores or storage structures (e.g., files, databases, data structures, data or other repositories, etc.) to store information (e.g., data relating to leakage detection). The database system may be included within or coupled to the server and/or client systems. The database systems and/or storage structures may be remote from or local to the computer or other processing systems, and may store any desired data (e.g., data relating to leakage detection).

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the present embodiments in the form disclosed. Many modifications and variations will be apparent to those of ordinary skill in the art without departing from the scope and spirit of the presented embodiments. The embodiment was chosen and described in order to best explain the principles of the presented embodiments and the practical application, and to enable others of ordinary skill in the art to understand various embodiments with various modifications as are suited to the particular use contemplated.

The descriptions of the various embodiments of the present embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of the presented embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, a computer-implemented method is provided comprising: authenticating, by a client application, a network security agent to dynamically obtain one or more security policies from the network security agent, wherein the client application and the network security agent are configured to execute on a user device and the network security agent is capable of communicating with a source of security policies; obtaining, by the client application, connection information that includes a request to initiate an encrypted connection with a destination entity; determining, by the client application, whether the encrypted connection between the client application and the destination entity is permitted according to the one or more security policies and based on the connection information; and establishing the encrypted connection between the client application and the destination entity in response to determining that the encrypted connection is permitted.

The operation of determining that the encrypted connection between the client application and the destination entity is permitted may include obtaining an assessment list comprising a plurality of entity names and a corresponding plurality of assessments, determining an assessment of the destination entity, and determining that the encrypted connection between the client application and the destination entity is permitted based on the assessment category.

The operation of determining that the encrypted connection between the client application and the destination entity is permitted may include obtaining, from the client application, an action list comprising one or more assessment categories and one or more associated actions, providing, by the client application, a request to the network security agent for a domain assessment, wherein the request includes the connection information, obtaining, by the client application, an assessment category, and determining that the encrypted connection between the client application and the destination entity is permitted based on the action associated with the assessment category.

In one form, the operation of obtaining an assessment category may further include performing the operation separately for each of a plurality of encrypted connections between the client application and one or more destination entities.

The method may further include providing, by the client application, one or more deliberately fictitious requests to the network security agent for a domain assessment, wherein the one or more deliberately fictitious requests comprise fictitious connection information In one form, the encrypted connection uses a Transport Layer Security protocol. In one form, the connection information comprises one or more of: a field in a certificate, a domain name, and a Transport Layer Security server name indication. In one form, the client application communicates with the network security agent via an extension installed in the client application. In one form, the client application is a web browser application.

The method may further include determining, by the client application, whether to query the network security agent in order to apply a security policy obtained from the network security agent for initiating the encrypted connection with the destination entity.

In one form, the operation of establishing the encrypted connection may include inserting a tag into an outbound data flow indicating that the one or more security policies have been applied to the encrypted connection.

In another form, a computer system is provided comprising: a communication interface configured to enable network communications; one or more computer processors; one or more computer readable storage media; program instructions stored on the one or more computer readable storage media for execution by at least one of the one or more computer processors, the program instructions comprising instructions to: authenticate, by a client application, a network security agent to dynamically obtain one or more security policies from the network security agent, wherein the client application and the network security agent are executing on a user device and the network security agent is capable of communicating with a source of security policies; obtain, by the client application, connection information that includes a request to initiate an encrypted connection with a destination entity; determine, by the client application, whether the encrypted connection between the client application and the destination entity is permitted according to the one or more security policies and based on the connection information; and establish the encrypted connection between the client application and the destination entity in response to determining that the encrypted connection is permitted.

In still another form, one or more non-transitory computer readable storage media are provided, encoded with instructions that, when executed by a processor, cause the processor to: authenticate, by a client application, a network security agent to dynamically obtain one or more security policies from the network security agent, wherein the client application and the network security agent are configured to execute on a user device and the network security agent is capable of communicating with a source of security policies; obtain, by the client application, connection information that includes a request to initiate an encrypted connection with a destination entity; determine, by the client application, whether the encrypted connection between the client application and the destination entity is permitted according to the one or more security policies and based on the connection information; and establish the encrypted connection between the client application and the destination entity in response to determining that the encrypted connection is permitted.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
authenticating, by a client application, a network security agent to dynamically obtain one or more security policies from the network security agent, wherein the client application and the network security agent are configured to execute on a user device and the network security agent communicates with a source of security policies;
obtaining, by the client application, connection information that includes a request to initiate an encrypted connection with a destination entity, wherein the connection information includes a domain name;
requesting, by the client application, the one or more security policies from the network security agent, wherein the one or more security policies are obtained by the network security agent from the source of security policies;
receiving, by the client application, the one or more security policies from the network security agent;
determining, by the client application, whether the encrypted connection between the client application and the destination entity is permitted according to the one or more security policies and based on the connection information, wherein the client application evaluates the connection information against the one or more security policies received from the network security agent, and wherein the client application employs end-to-end encryption to encrypt the connection information before the connection information leaves the client application; and establishing the encrypted connection between the client application and the destination entity in response to determining that the encrypted connection is permitted.

2. The computer-implemented method of claim 1, wherein determining that the encrypted connection between the client application and the destination entity is permitted comprises:

obtaining an assessment list comprising a plurality of entity names and a corresponding plurality of assessment categories;

determining an assessment category for the destination entity; and determining that the encrypted connection between the client application and the destination entity is permitted based on the assessment category.

3. The computer-implemented method of claim 1, wherein determining that the encrypted connection between the client application and the destination entity is permitted comprises:

obtaining, from the client application, an action list comprising one or more assessment categories and one or more associated actions;

providing, by the client application, a request to the network security agent for a domain assessment, wherein the request includes the connection information;

obtaining, by the client application, an assessment category; and determining that the encrypted connection between the client application and the destination entity is permitted based on an action associated with the assessment category.

4. The computer-implemented method of claim 3, wherein the obtaining the action list is performed separately for each of a plurality of encrypted connections between the client application and one or more destination entities.

5. The computer-implemented method of claim 3, further comprising:

providing, by the client application, one or more deliberately fictitious requests to the network security agent for a domain assessment, wherein the one or more deliberately fictitious requests comprise fictitious connection information.

6. The computer-implemented method of claim 1, wherein the encrypted connection uses a Transport Layer Security protocol.

7. The computer-implemented method of claim 1, wherein the connection information further comprises one or more of: a field in a certificate, and a Transport Layer Security server name indication.

8. The computer-implemented method of claim 1, further comprising:

determining, by the client application, whether to query the network security agent in order to apply a security policy obtained from the network security agent for initiating the encrypted connection with the destination entity.

9. The computer-implemented method of claim 1, further comprising the client application communicating with the network security agent via an extension installed in the client application.

10. The computer-implemented method of claim 1, wherein the client application is a web browser application.

11. The computer-implemented method of claim 1, wherein the establishing the encrypted connection further comprises inserting a tag into an outbound data flow indicating that the one or more security policies have been applied to the encrypted connection.

12. An apparatus comprising:

a communication interface configured to enable network communications;

one or more computer processors;

one or more computer readable storage media; and program instructions stored on the one or more computer readable storage media for execution by at least one of the one or more computer processors, the program instructions including instructions for a client application and for a network security agent, and when executed by the one or more computer processors, cause the one or more computer processors to:

authenticate, by the client application, the network security agent to dynamically obtain one or more security policies from the network security agent, wherein the network security agent communicates with a source of security policies;

obtain, by the client application, connection information that includes a request to initiate an encrypted connection with a destination entity, wherein the connection information includes a domain name;

request, by the client application, the one or more security policies from the network security agent, wherein the one or more security policies are obtained by the network security agent from the source of security policies;

receive, by the client application, the one or more security policies from the network security agent;

determine, by the client application, whether the encrypted connection between the client application and the destination entity is permitted according to the one or more security policies and based on the connection information, wherein the client application evaluates the connection information against the one or more security policies received from the network security agent, and wherein the client application employs end-to-end encryption to encrypt the connection information before the connection information leaves the client application; and establish the encrypted connection between the client application and the destination entity in response to determining that the encrypted connection is permitted.

13. The apparatus of claim 12, wherein the instructions to determine that the encrypted connection between the client application and the destination entity is permitted comprise instructions to:

obtain an assessment list comprising a plurality of entity names and a corresponding plurality of assessment categories;

determine an assessment category for the destination entity; and determine that the encrypted connection between the client application and the destination entity is permitted based on the assessment category.

14. The apparatus of claim 12, wherein the instructions to determine that the encrypted connection between the client application and the destination entity is permitted comprise instructions to:
- obtain, from the client application, an action list comprising one or more assessment categories and one or more associated actions;
- provide, by the client application, a request to the network security agent for a domain assessment, wherein the request includes the connection information;
- obtain, by the client application, an assessment category; and
- determine that the encrypted connection between the client application and the destination entity is permitted based on an action associated with the assessment category.

15. The apparatus of claim 14, further comprising instructions to:
- provide, by the client application, one or more deliberately fictitious requests to the network security agent for a domain assessment, wherein the one or more deliberately fictitious requests comprise fictitious connection information.

16. The apparatus of claim 12, further comprising instructions for the client application to communicate with the network security agent via an extension installed in the client application.

17. One or more non-transitory computer readable storage media encoded with instructions that, when executed by a processor, cause the processor to:
- authenticate, by a client application, a network security agent to dynamically obtain one or more security policies from the network security agent, wherein the client application and the network security agent are configured to execute on a user device and the network security agent communicates with a source of security policies;
- obtain, by the client application, connection information that includes a request to initiate an encrypted connection with a destination entity, wherein the connection information includes a domain name;
- request, by the client application, the one or more security policies from the network security agent, wherein the one or more security policies are obtained by the network security agent from the source of security policies;
- receive, by the client application, the one or more security policies from the network security agent;
- determine, by the client application, whether the encrypted connection between the client application and the destination entity is permitted according to the one or more security policies and based on the connection information, wherein the client application evaluates the connection information against the one or more security policies received from the network security agent, and wherein the client application employs end-to-end encryption to encrypt the connection information before the connection information leaves the client application; and
- establish the encrypted connection between the client application and the destination entity in response to determining that the encrypted connection is permitted.

18. The one or more non-transitory computer readable storage media of claim 17, wherein the instructions to determine that the encrypted connection between the client application and the destination entity is permitted comprise instructions to:
- obtain an assessment list comprising a plurality of entity names and a corresponding plurality of assessment categories;
- determine an assessment category for the destination entity; and
- determine that the encrypted connection between the client application and the destination entity is permitted based on the assessment category.

19. The one or more non-transitory computer readable storage media of claim 17, wherein the instructions to determine that the encrypted connection between the client application and the destination entity is permitted comprise instructions to:
- obtain, from the client application, an action list comprising one or more assessment categories and one or more associated actions;
- provide, by the client application, a request to the network security agent for a domain assessment, wherein the request includes the connection information;
- obtain, by the client application, an assessment category; and
- determine that the encrypted connection between the client application and the destination entity is permitted based on an action associated with the assessment category.

20. The one or more non-transitory computer readable storage media of claim 19, further comprising instructions to:
- provide, by the client application, one or more deliberately fictitious requests to the network security agent for a domain assessment, wherein the one or more deliberately fictitious requests comprise fictitious connection information.

* * * * *